US011577103B1

(12) United States Patent
Candela

(10) Patent No.: US 11,577,103 B1
(45) Date of Patent: Feb. 14, 2023

(54) FIREFIGHTER RESCUE SYSTEM

(71) Applicant: Gary Joseph Candela, Westminster, MD (US)

(72) Inventor: Gary Joseph Candela, Westminster, MD (US)

(*) Notice: Subject to any disclaimer, the term of this patent is extended or adjusted under 35 U.S.C. 154(b) by 370 days.

(21) Appl. No.: 16/898,571

(22) Filed: Jun. 11, 2020

Related U.S. Application Data

(60) Provisional application No. 62/861,575, filed on Jun. 14, 2019.

(51) Int. Cl.
*A62B 35/00* (2006.01)
*A62B 5/00* (2006.01)
*F16B 45/02* (2006.01)

(52) U.S. Cl.
CPC ............ *A62B 35/0025* (2013.01); *A62B 5/00* (2013.01); *A62B 35/0006* (2013.01); *F16B 45/02* (2013.01)

(58) Field of Classification Search
CPC ............ A62B 35/0006; A62B 35/0025; A61G 7/1023
See application file for complete search history.

(56) References Cited

U.S. PATENT DOCUMENTS

| 1,490,066 | A | | 4/1924 | Carr | |
|---|---|---|---|---|---|
| 4,197,816 | A | * | 4/1980 | Lusch | A62B 35/0006 182/6 |
| 5,152,013 | A | | 10/1992 | Johnson | |
| 5,351,654 | A | | 10/1994 | Fuentes | |
| 5,551,379 | A | * | 9/1996 | Hart | B60P 7/0823 119/797 |
| 5,806,087 | A | * | 9/1998 | Grotefend | A41F 9/005 2/311 |
| 6,250,699 | B1 | | 6/2001 | Robertson | |
| 7,467,419 | B2 | * | 12/2008 | O'Neal | A62B 35/0025 2/69 |
| 8,015,619 | B2 | | 9/2011 | McKay et al. | |
| 8,016,335 | B2 | | 9/2011 | McKay | |
| D719,303 | S | | 12/2014 | Anderson | |
| 9,694,220 | B2 | | 7/2017 | Gibbs | |
| 9,764,930 | B2 | | 9/2017 | Schroeder | |
| 10,603,528 | B1 | * | 3/2020 | Bologna | A62B 35/0006 |

(Continued)

OTHER PUBLICATIONS

Sales offer for "Rapid Packaging Strap (RPS) Nylon", https://www.adaptovercometraining.com/apparel-gear/rps, publication date unknown.
(Continued)

*Primary Examiner* — Tajash D Patel
(74) *Attorney, Agent, or Firm* — Rosenberg Klein & Lee

(57) ABSTRACT

A firefighter rescue system includes a pair of clasp members connected to opposing ends of a longitudinally extended and flexible harness. The system further includes a pair of handles respectively secured to the harness in longitudinally spaced relationship. The flexible harness includes first and second strap members. The first strap member is coupled to one of the pair of clasp members on one end thereof, and affixed on an opposing end to a length adjusting mechanism. The second strap member has a first end thereof coupled to the other of the pair of clasp members and an opposing second end threaded through length adjusting mechanism. By that arrangement, a distance between the first end of the second strap member and the length adjusting mechanism is adjustably settable.

24 Claims, 16 Drawing Sheets

(56) References Cited

U.S. PATENT DOCUMENTS

| | | | |
|---|---|---|---|
| 2004/0182644 A1 | 9/2004 | Kotarski | |
| 2004/0194733 A1 | 10/2004 | Bremm | |
| 2006/0070799 A1 | 4/2006 | Grilliot et al. | |
| 2007/0084667 A1 | 4/2007 | Waters et al. | |
| 2011/0302685 A1* | 12/2011 | Fay, III | A62B 35/0012 2/69 |
| 2015/0021118 A1* | 1/2015 | Doty | A62B 35/0006 182/3 |
| 2016/0361576 A1 | 12/2016 | Gibbs | |

OTHER PUBLICATIONS

Sales offer for "ARS Multi-Loop Rescue Strap with Carabiner", thefirestore.com, publication date unknown.

Sales offer for "Columbus RIT Pack", edarley.com, publication date unknown.

Sales offer for "Darkside? Rescue Extraction Device", tacticaltech1 com, publication date unknown.

Sales offer for "Ex-Tract Strap", narescue.com, publication date unknown.

Sales offer for "Firefighters Drag Sling", liveactionsafety.com, publication date unknown.

Sales offer for "NAR Dragon Handle System", rescue-essentials. com, publication date unknown.

Sales offer for "Recovery Drag Strap with Caribiners", 1110gear. com, publication date unknown.

Sales offer for "Rescue Drag Strap, TEMS, TCCC, Fire Rescue, Law Enforcement", worthpoint com, publication date unknown.

Sales offer for "Save-A-Jake Rapid Intervention Firefighter Rescue Tool", savajake.com, publication date unknown.

"Firefighter Removal: 'You Have Options'", Station Pride No. 1, https://station-pride.com/2015/09/07/firefighter-removal-you-have-options/, published Mar. 17, 2019.

"What is the proper way to do fireman's carry for a victim on the ground?", Quora, https://www.quora.com/What-is-the-proper-way-to-do-firemans-carry-for-a-victim-on-the-ground, published Aug. 26, 2016.

* cited by examiner

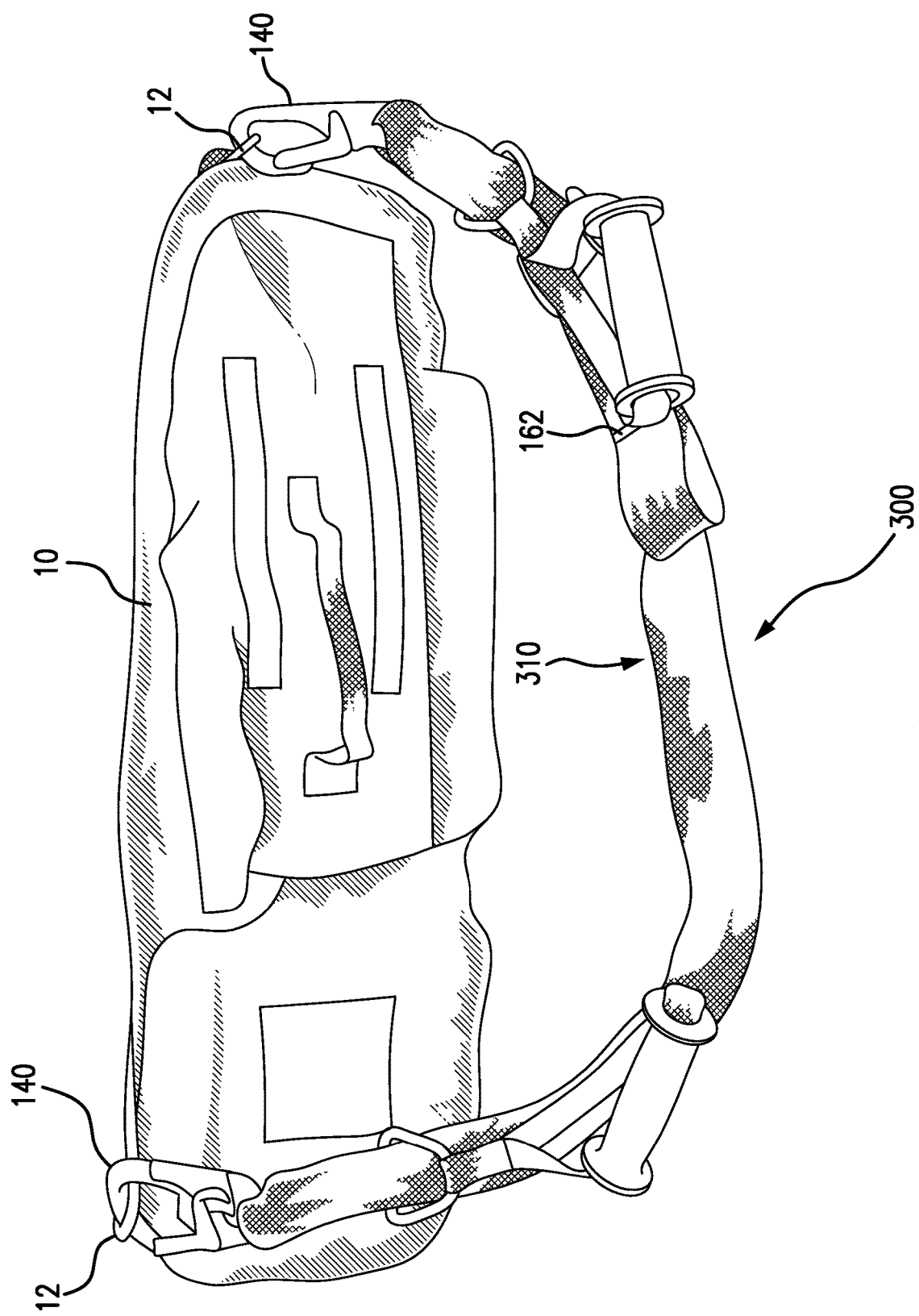

FIREFIGHTER RESCUE SYSTEM

REFERENCE TO RELATED APPLICATION

This Application is based on Provisional Patent Application Ser. No. 62/861,575, filed 14 Jun. 2019, currently pending.

BACKGROUND OF THE INVENTION

Firefighting is a dangerous endeavor and there is always the potential of a firefighter being injured, in distress or otherwise incapacitated and in need of being extracted from their location and brought to a safe location. For that reason, there is a rapid intervention team (RIT), also called a rapid intervention crew (RIC), that is assembled as part of the initial fire attack and they are assigned outside of the burning structure to look for egress, to listen to the radio for distress calls from a firefighter within the structure, and to get the proper tools to be ready and staged just in case a firefighter goes down, is in distress or a mayday is called. This special team of firefighters is designated to be deployed to go find a downed firefighter and get them into a place of safety, a place outside of the burning structure. To get them out of the structure, the number one piece of equipment that team members take with them is a RIT (or RIC) bag. The RIT bag has a spare air cylinder to give the firefighter air if he needs it, a spare face piece to replace his face piece if he needed that, and other different tools designed to get the downed firefighter out of entanglements. Then, using webbing that all firefighters carry separately, the downed firefighter is dragged to a place of safety.

The webbing that has been used to drag a downed firefighter has taken many forms over the years, and has taken the form of various harnesses or continuous loops of webbing that must be applied to the downed firefighter in a particular manner. These drag harnesses and drag straps have all suffered similar problems, such as being complicated and potentially injurious to the downed firefighter if not engaged properly with the downed firefighter, requiring a great deal of training to obviate that danger. These prior systems must be utilized under very adverse conditions of a high temperature environment and low visibility, and must be applied by a rescuer wearing thick gloves and bulky outerwear that restricts their range of motion. In light of these issues with the existing drag harnesses and drag straps, fire departments have needed a new rescue system for downed firefighters that overcomes those problems.

SUMMARY OF THE INVENTION

A firefighter rescue system is provided. The firefighter rescue system includes a pair of clasps, and a longitudinally extended and flexible harness coupled to the pair of clasps on opposing ends thereof. The firefighter rescue system further includes a pair of handles respectively secured to the harness in longitudinally spaced relationship.

From another aspect, a firefighter rescue system including a pair of clasps is provided. The firefighter rescue system further includes a longitudinally extended and flexible harness that has a first strap member, a second strap member and length adjusting mechanism. Each of the first and second strap members has respective first ends coupled to the pair of clasps, and an opposing second end of the first strap member is coupled to the length adjusting mechanism. A second end portion of the second strap member is adjustably engaged with the length adjusting mechanism. By that arrangement, a distance between the length adjusting mechanism and the first end of the second strap member is adjustable. Still further, the firefighter rescue system includes a pair of attachment rings respectively coupled to the first and second strap members.

BRIEF DESCRIPTION OF THE DRAWINGS

FIG. 10 is an illustration of the present invention configured for transport as a shoulder strap of a RIT bag;

DETAILED DESCRIPTION OF THE SYSTEM

Figure 1:
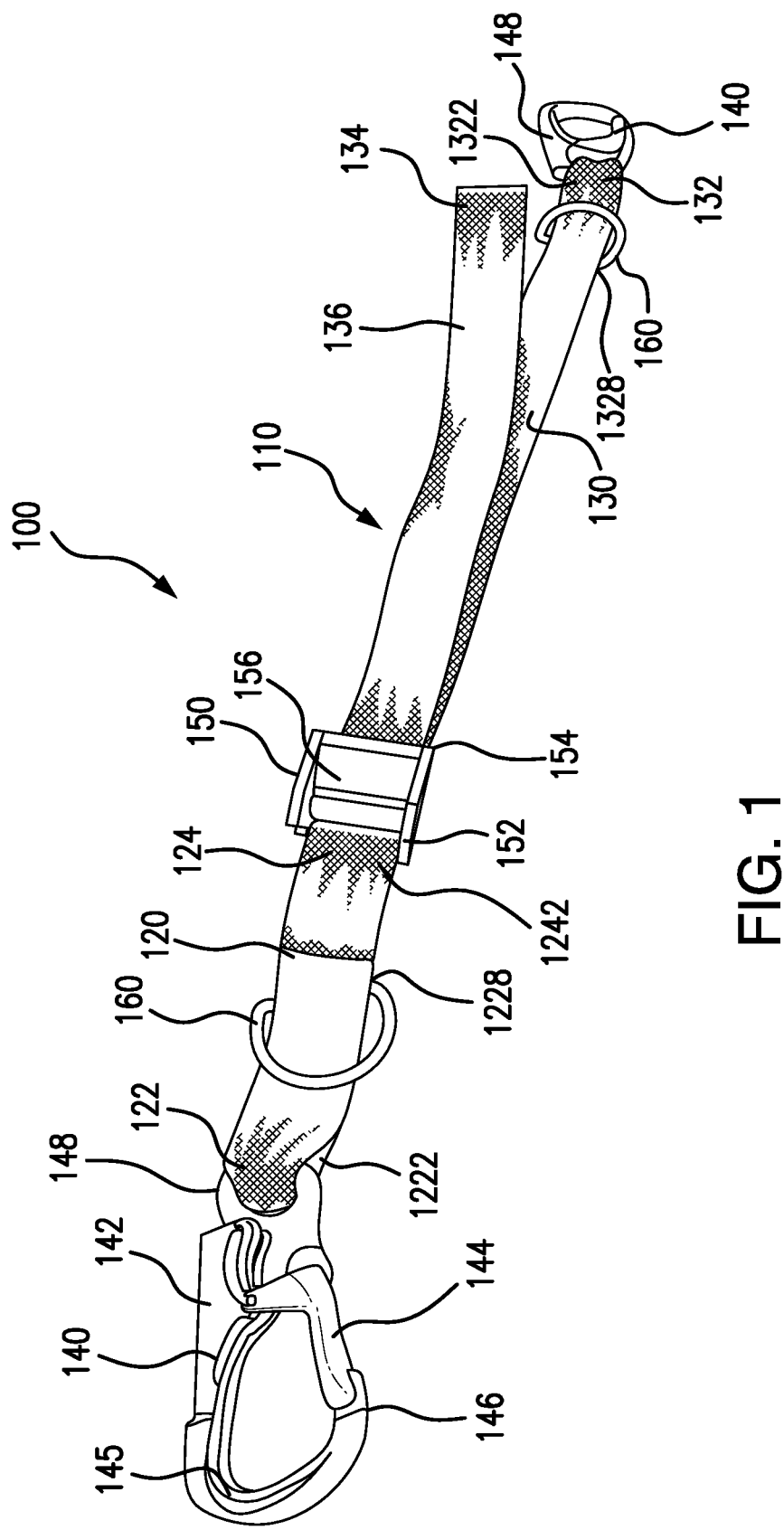
FIG. 1 is a perspective view of one configuration of the firefighter rescue system of the present invention.

Referring to attached FIGS. 1-14, there is shown firefighter rescue system 100, 200, 300 that is structurally simple, quickly and safely deployable with gloved hands, and avoids the addition of yet another piece of equipment that must be transported to a downed fighter by a rapid intervention team that is assigned to be stand ready to be sent into an involved structure to find a downed firefighter, and get that firefighter to a place of safety outside of that structure. In particular, firefighter rescue system 100, 200, 300 includes a longitudinally extended and flexible harness 110, 210, 310 respectively coupled on opposing ends to a pair of clasps 140, and having a pair of handles 170, 270, 370 coupled thereto in longitudinally spaced relationship. By flexible, it is meant that harness 110, 210, 310 is substantially conformable to the body of the person on which it has been applied, in the same manner as a leather belt is conforms to the waist of a wearer. Each of the handles 170, 270, 370 includes a handle strap 172, 272, 372 extending between a hand grip 174, 274, 374 and the harness 110, 210, 310.

As will be described in following paragraphs, the firefighters that enter structures involved in a fire, or are suspected of being involved, in a fire, or other situations involving the potential exposure to noxious or toxic gases, wear a self-contained breathing apparatus (SCBA) 15. Firefighter rescue system 100, 200, 300 is designed to serve as a shoulder strap of a RIT bag for storage and transport. When needed, firefighter rescue system 100, 200, 300 is then quickly and easily removed from the RIT bag, applied to the downed firefighter and coupled to the backplate 20 of a SCBA 15 by a gloved rescuing firefighter, cinched tightly to remove any slack between the backplate 20 and the downed firefighter, and finally, using the handles 170, 270, 370, the downed firefighter is dragged to safety.

While the use of firefighter rescue system 100, 200, 300 is described here in for extricating a downed firefighter to safety, it should be understood that system 100, 200, 300 may also be employed for extricating other first responders, military personal and civilians. For those other personal not equipped with a self-contained breathing apparatus to which system 100, 200, 300 can be coupled, the flexible harness 110, 210, 310 can be connected around the upper torso of the person to be extracted. The flexible harness 110, 210, 310 is connected to the person by encompassing the person's upper torso with the flexible harness 110, 210, 310 and connecting opposing end portions thereof together and then cinching the harness tightly. Depending upon the girth of the person being extracted, the clasp 140 on one end of the flexible harness 110, 210, 310 may be connected to a closed ring 160 disposed on the opposing end thereof, or alternately, the two clasps 140 on opposing ends of the flexible harness 110, 210, 310 may be connected one to the other.

Additionally, by passing the harness 110, 210, 310 between the legs of a downed firefighter, firefighter rescue system 100, 200, 300, in combination with the SCBA backplate 20, can serve as a lifting harness to further aid in extricating the downed firefighter, where hoisting the firefighter to a higher elevation or lowering the firefighter from a higher elevation is required. It should be understood that the structure of first strap member 120, 220, 320 and second strap member 130, 230, 330 of the corresponding harness 110, 210, 310, and the material from which they are formed, are identical, other than the attachment of the handles 170, 270, 370 to the first and second strap members 120, 220, 320 and 130, 230, 330.

Figure 2:
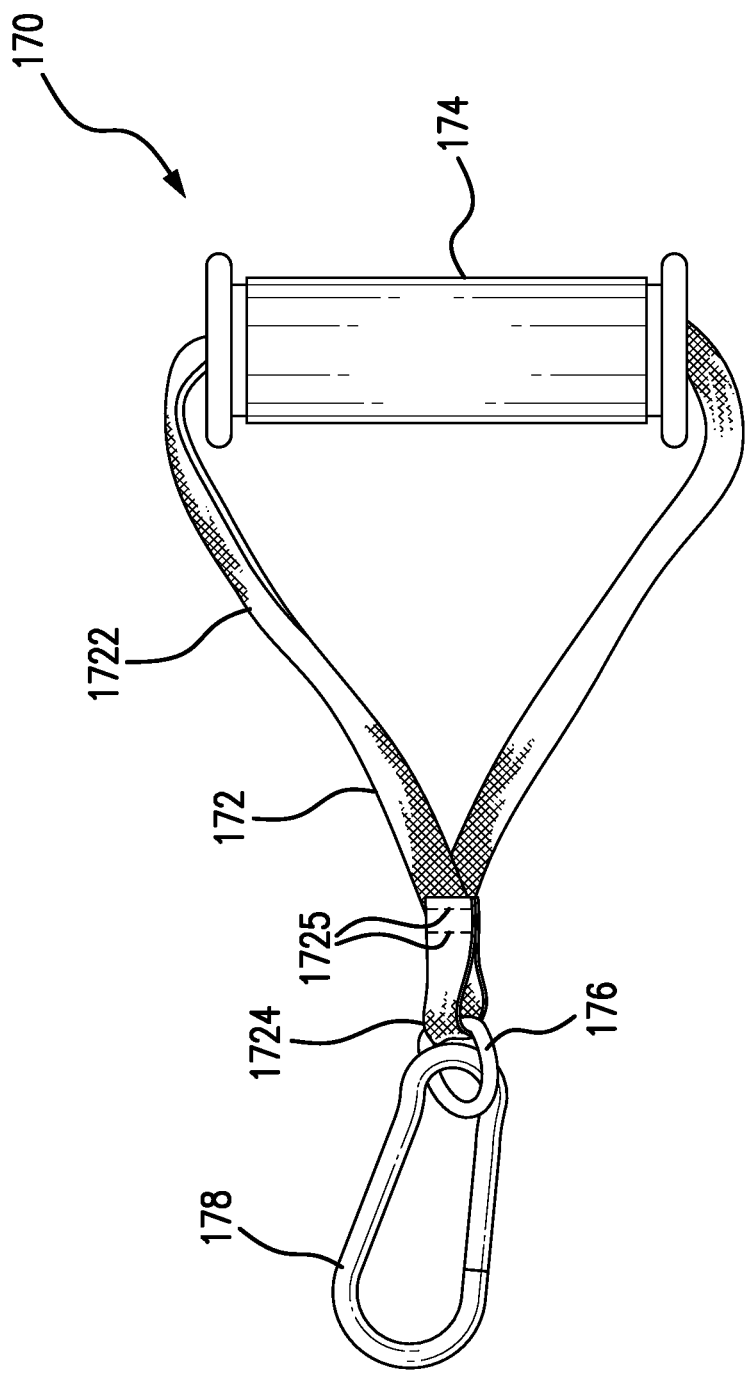
FIG. 2 is an illustration of a handle assembly of the present invention.

Turning now specifically to FIGS. 1 and 2, there is shown firefighter rescue system 100 that includes a pair of clasps 140 coupled to opposing ends of a longitudinally extended and flexible harness 110. A pair of handles 170 are provided to be coupled to the harness 110, as will be subsequently described. The harness 110 includes first and second strap members 120 and 130, which are formed of woven or unwoven synthetic fiber that may include, but are not limited to, polyester, nylon, polypropylene or combinations thereof. The synthetic fiber webbing is preferably provided in any of a plurality of high visibility colors. The visibility of harness 110 may be further enhanced by use of webbing that includes "glow in the dark" and/or reflective fibers or stitching, such as the stitching 3325 shown in FIG. 8. First and second strap members 120 and 130 may also be formed of other materials, such as natural or synthetic leather without departing from the inventive concepts disclosed herein. In one working embodiment, first strap member 120 and second strap member 130 are each formed by a 2 inch wide, woven polyester web having a minimum breaking strength of 12,000 pounds and a working load of 4,000 pounds. In that one working embodiment, the clasps 140 are aluminum, double-action carabiners, which may be a Kong Tango carabiner, such as part no. 368100, available from Kong S.p.a. of Monte Marenzo, Italy, having a minimum breaking strength of 7,418 pounds.

While the clasps 140 need not be of the locking type, use of a double-action clasp, where the gate thereof is locked and must be released to be both engaged and disengaged from a mating element, is advantageous. Use of a double-action clasp avoids the potential of the clasps catching on any debris, structural element or electrical cables that might be encountered as a downed firefighter is being dragged through a structure. Each carabiner 140, of the exemplary embodiment, includes a securement eye 148 by which it is coupled to the harness 110 via corresponding securement loops 1222 formed in the first strap member 120 and securement loop 1322 formed in the second strap member 130.

Each exemplary carabiner 140 includes a gate 144 that lockingly engages the nose 146 and released therefrom by depression of the gate release lever 142. Gate release lever 142 may be operated (depressed) by the palm of the user's hand, allowing the gate 144 to then be displaced by the user's finger when disengaging the basket 145 of carabiner from an element with which it was engaged, such as a shoulder strap engagement ring of the RIT bag, or allowing the gate 144 to be displaced by the element with which it is being engaged, such as a side handle of a SCBA backplate, by pushing gate 144 against the element after depressing the gate release lever 142.

The harness 110 is a longitudinally extended assembly of flexible straps, identified as a first strap member 120 and a second strap member 130. Strap member 120 has a first end 122 coupled to the securement eye 148 of the corresponding clasp 140 and a second opposing end 124 coupled to a fixed end 152 of a length adjusting mechanism 150, which in one working embodiment is a cam buckle. The first end 122 is formed as a loop interlocked with the securement eye 148. The loop is formed by passing the corresponding end of the webbing that forms first strap member 120 through the securement eye 148 and bringing it back in the opposing direction for securement to the adjacent webbing by stitching, as will be further described with respect to the embodiment of FIGS. 3-5. The second end 124 is likewise formed as a loop interlocked with the fixed end 152 of the cam buckle 150. The cam buckle engaging loop at the second end 124 is formed by passing the corresponding end of the webbing through opening provided in the fixed end 152 of cam buckle 150 and bringing it back in the opposing direction for securement to the adjacent webbing by stitching, as will also be further described with respect to the embodiment of FIGS. 3-5. The length adjusting mechanism 150 is a manually releasable self-locking buckle for webbing. In one working embodiment, the length adjusting mechanism 150 is a model MC2 cam buckle available from Granger of Lake Forest, Ill., having a minimum breaking strength of 2,500 pounds and a working load of 833 pounds. Although a ratchet buckle may be used as the length adjusting mechanism 150, a ratchet buckle is significantly heavier than a cam buckle and takes significantly more time and effort to tighten harness 110. Therefore, although a ratchet buckle may be used as in harness 110, it is believed that a cam buckle is the better option. The second strap member 130 has a first end 132 coupled to the securement eye 148 of the corresponding second of the clasps 140, and a second opposing end 134 threaded through the adjustment end 154 of the cam buckle 150, so that a distance between the second clasp 140 and the cam buckle is adjustable. The second end 134 of the second strap member 130 is formed as a loop of sufficient size to create a handhold 136 for a gloved rescuer to easily grasp the second end 134 and tighten the harness 110 to a downed firefighter.

Figure 6:
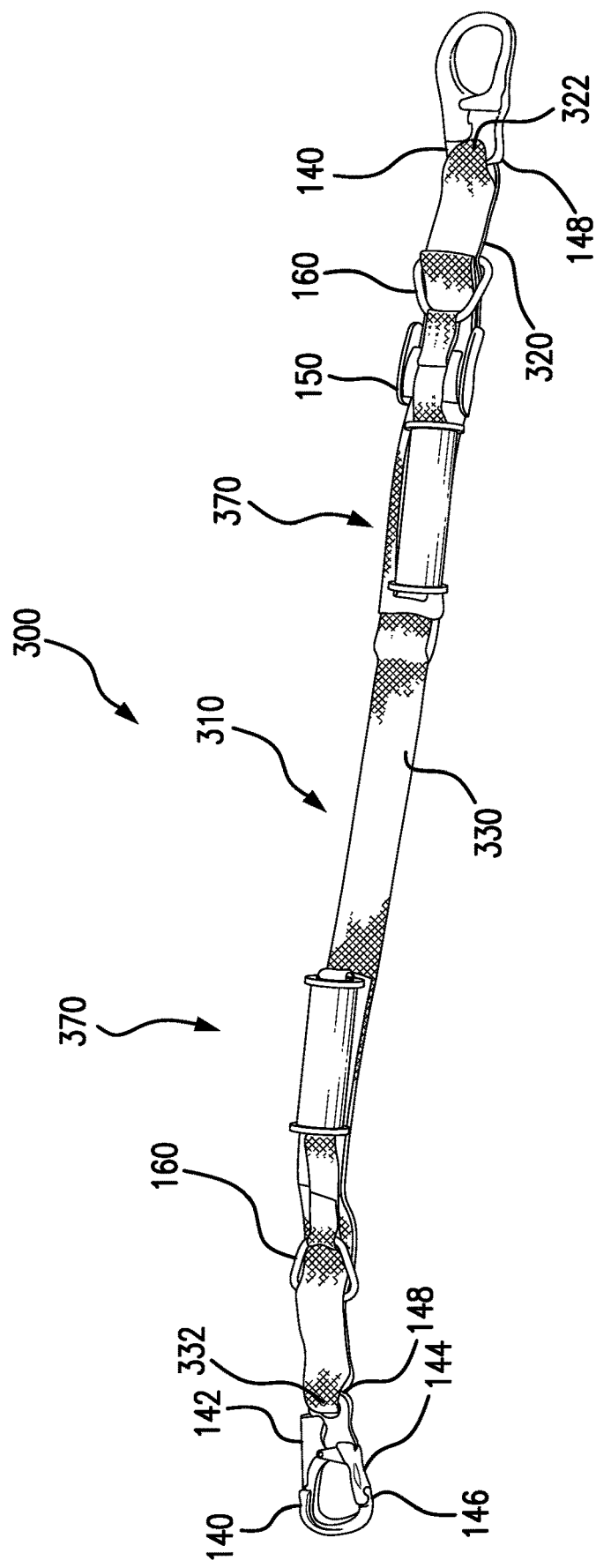
FIG. 6 illustrates an arrangement of the present invention in a storage and transport configuration.

Harness 110 further includes at least two closed rings 160 that function as attachment rings to which the handles 170 and/or various accessories, such as elongated webbing straps, the use of which lowers the drag angle and thereby allows rescuers to utilize their leg muscles more efficiently for long distance dragging situations. The rings 160 are each disposed in a respective ring receiving pocket 1228 formed in the first strap member 120, and ring receiving pocket 1328 formed in the second strap member 130. The closed rings 160 may have any of a variety of shapes, such as circular, D-shaped and delta shaped rings. In one working embodiment, the closed rings 160 are delta shaped rings, as shown in FIG. 6, having a minimum breaking strength of 5,000 pounds and a working load of 1,660 pounds.

Each of handles 170 includes a handle strap 172, which may be formed of one inch synthetic webbing. In one working embodiment, the handle strap 172 has a minimum breaking strength of 3,000 pounds and a working load of 1,000 pounds. The handle strap 172 is formed in two loops 1722 and 1724. The first of the two loops 1722 is threaded through a tubular hand grip 174 that serves to hold the first loop open to allow the gloved hand of a rescuer to quickly and easily grasp the handle 170 by the hand grip 174, and aids in distributing the pulling force being applied to the handle over a greater surface area of the rescuer's hand. The second loop 1724, a significantly smaller loop than the first loop 1722, provides coupling to a securement ring 176 that in turn is coupled to a clasp 178 that is used for connecting the handle 170 to a respective one of the closed rings 160. The ends of the handle strap 172 are overlapped and overlay an intermediate portion of the strap material between the first and second loops 1722 and 1724, and secured by stitching 1725.

Figure 3:
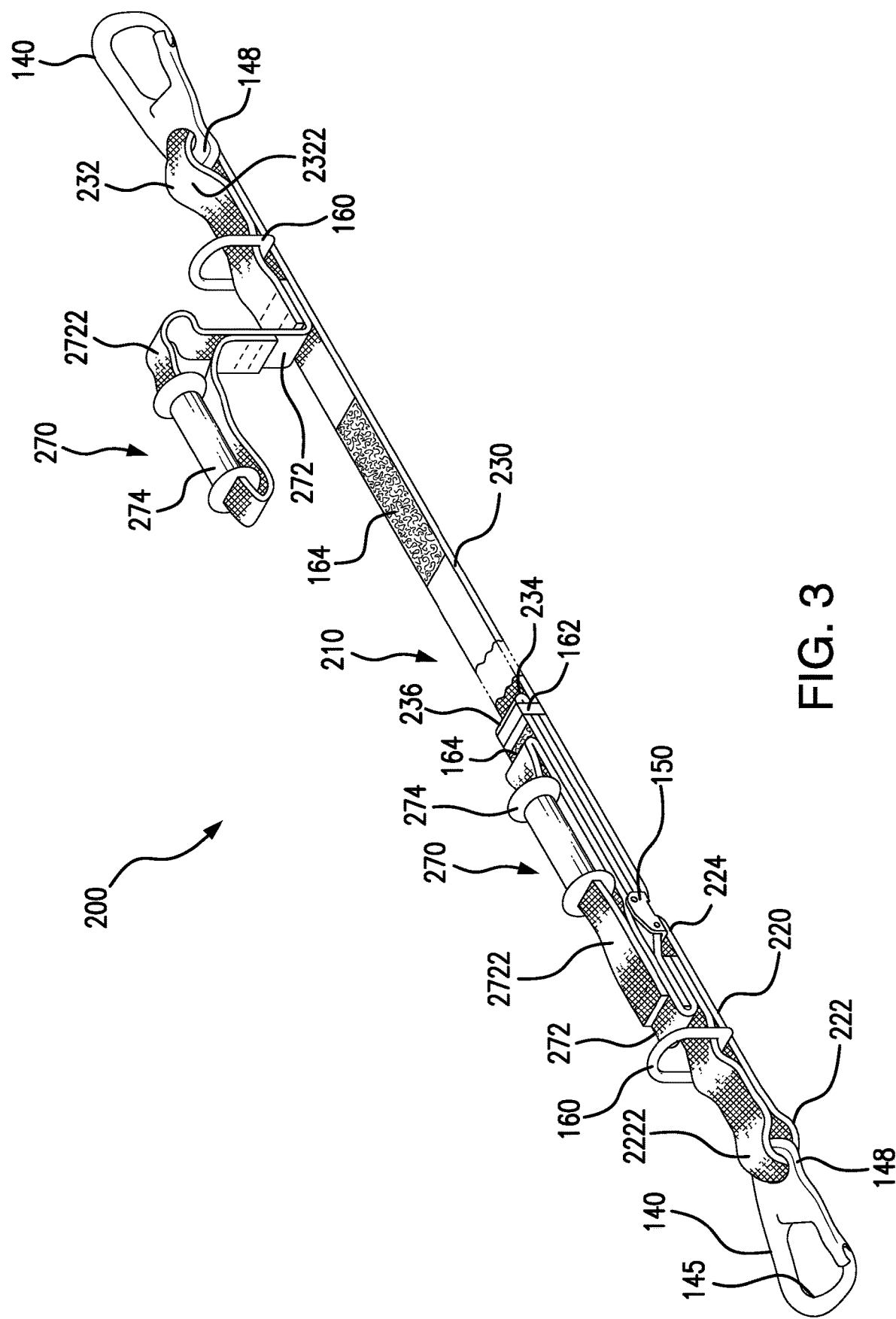
FIG. 3 is a perspective view of another configuration of the firefighter rescue system of the present invention.
Figure 4:
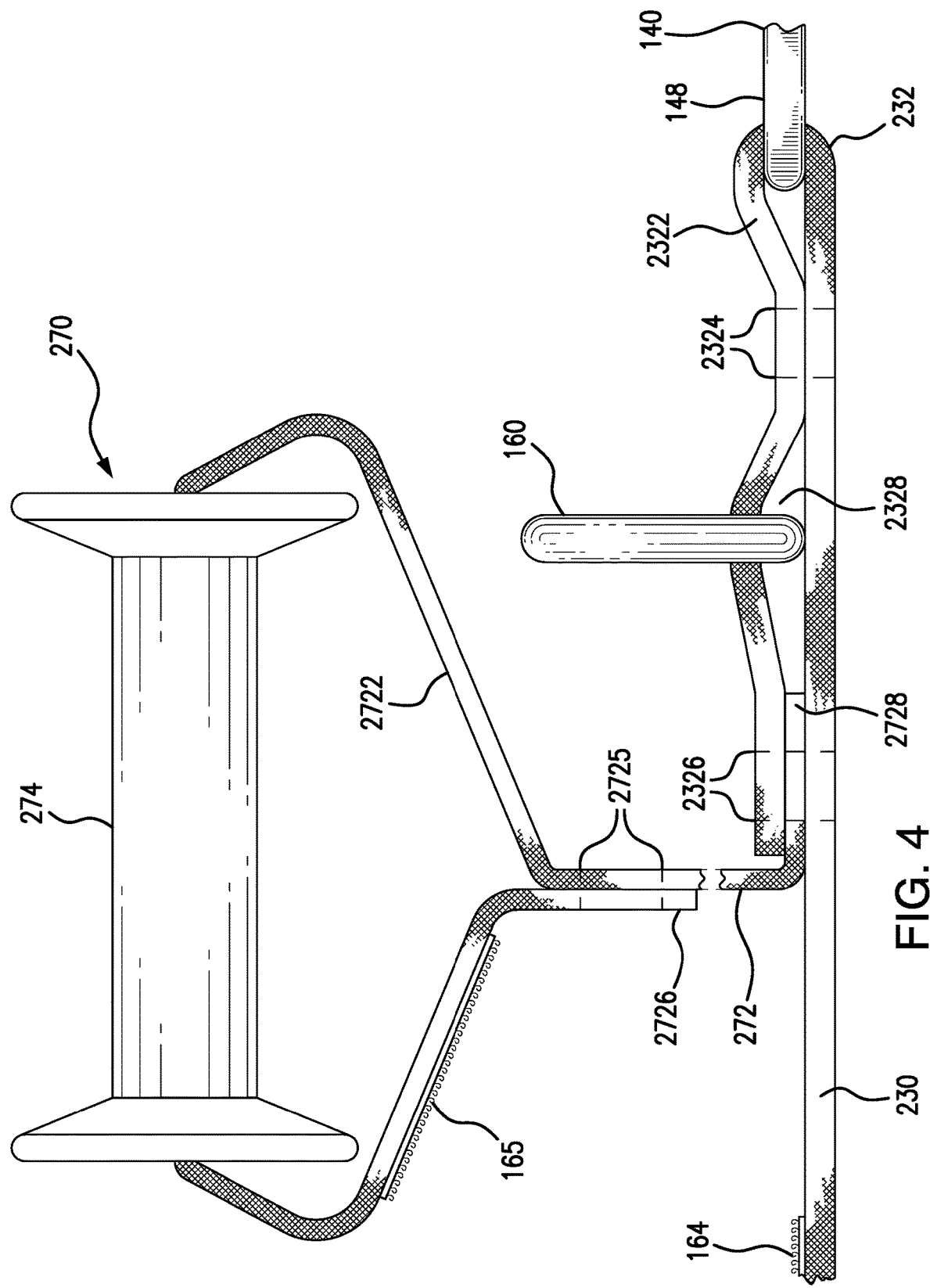
FIG. 4 is an enlarged partial view of one end of the firefighter rescue system illustrated in FIG. 3.
Figure 5:
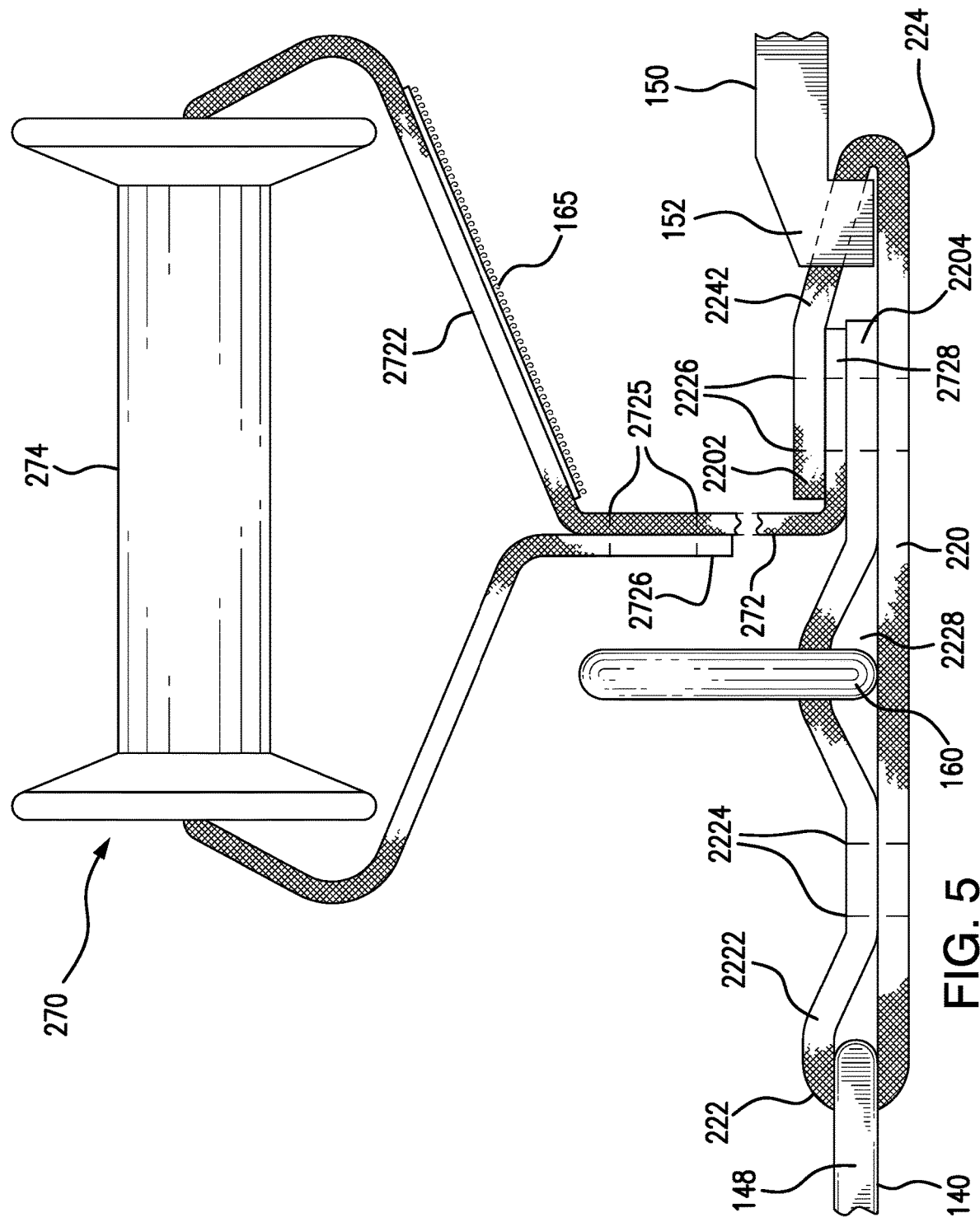
FIG. 5 is an enlarged partial view of another end of the firefighter rescue system illustrated in FIG. 3.

Firefighter rescue system 200 is shown in FIGS. 3-5 and differs from system 100 in only two respects; the handles 270 are permanently affixed to the flexible harness 210, and the handles 270 and harness 210 include complementary hook and loop type fastener strips 164 and 165 for maintaining handles 270 in a storage position when not in use. Therefore, outside of the exceptions mentioned above, that which has been described with respect to FIGS. 1 and 2 are to be incorporated herein, and the details of the structure of the first and second straps 220 and 230 described in following paragraphs, and not heretofore described with respect to FIG. 1, are applicable to and are to be incorporated into the description of the first and second straps 120 and 230 discussed in preceding paragraphs.

Firefighter rescue system 200 includes a longitudinally extended and flexible harness 210 respectively coupled on opposing ends thereof to a pair of clasps 140. Clasps 140 may each be a double-action carabiner that operates as previously described and are secured to the harness 210 by a respective securement eye 148. Harness 210 includes a first strap member 220 and second strap member 230 joined together by a cam buckle 150. Still further, the harness 210 includes a pair of handles 270 permanently affixed thereto. Each of the first strap member 220 and second strap member 230 has a respective one of the pair of handles 270 coupled thereto.

As distinct from the harness 110, harness 210 includes a pair of hook and loop fastener strips 164 secured to different portions of the second strap member 230. One of the hook and loop fastener strips 164 is disposed in proximity to the first end 232 of the second strap member 230 and the other is disposed adjacent the second end 234, on the handhold loop 236, of the second strap member 230 (more clearly shown in the like structure of FIGS. 9A and 9B). The handles 270 each include a complementary hook and loop fastener strip 165 for releasable coupling with a corresponding one of the hook and loop fastener strips 164 to maintain the handles 270 in a stowage position when not in use. The handles 270 would be in the stowage position during transport, where the system 200 serves as a shoulder strap for a RIT bag, or while being initially applied to a downed firefighter. The harness 210 further includes a continuous plastic band 162 slidingly disposed on the second strap member 230 that is slid over the second end 236 to retain the handhold loop 236 in overlaying relationship with a portion of the second strap member 230 adjacent to the length adjusting mechanism 150, for aiding in maintaining the handhold loop 236 and the corresponding handle 270 in their respective stowage positions until needed.

The first end 232 of the second strap member 230 is formed by threading an end portion of the webbing material through the securement eye 148 of the corresponding clasp 140 and then folding it over an adjacent portion of the webbing and securing them together by stitches 2324 to form the securement loop 2322. The end portion of the webbing is passed through a closed ring 160 and a second set of stitches 2326 secure the end portion of the webbing to the underlying adjacent webbing portion, at a location longitudinally spaced from the stitching 2324 to form a ring receiving pocket 2328 in which the closed ring is thereby secured. The handle 270 associated with the second strap member 230 has a handle strap 272. A distal end 2728 of that handle 270 is sandwiched between the end of the webbing and the underlying adjacent portion of the webbing, and secured thereat by the stitching 2326, as shown in FIG. 4.

Each of the handles 270 includes an associated handle strap 272, which may be formed of one inch synthetic webbing, as previously described. The handle strap 272 is formed in a single loop 2722. A first or proximal end 2726 of the handle strap 272 is threaded through the tubular hand grip 274 and positioned to overlap an intermediate portion of the handle strap and secured thereat by the stitching 2725. Each handle 270 further includes the hook and loop fastener strip 165 coupled to a portion of the handle strap 272 of the loop 2722 for releasable attachment to a corresponding one of the complementary hook and loop fastener strips 164. As described above, the second or distal end 2728 of handle strap 272 of the handle 270 coupled to the strap member 230, is sandwiched between the end of the webbing and underlying adjacent portion of the webbing of the second strap member 230, and secured thereat by the stitching 2326. The coupling of the other handle 270 to the first strap member 220 is described below.

The first end 222 of the first strap member 220 is formed in the same manner as that of the first end 232 of the second strap member 230, whereby a securement loop 2222 is formed and engaged with the securement eye 148 of the associated clasp 140 by passing the webbing end 2204 through the securement eye 148 and joining overlying portions of webbing by stitching 2224, as shown in FIG. 5. The opposing end of the webbing 2202 is threaded through the fixed end 152 of the cam buckle 150 and overlays the webbing end 2204 and is also secured thereto by the stitching 2226 to form a securement loop 2242. Hereto, the distal end 2728 of the handle strap 272 of the handle 270 associated with first strap member 220 is sandwiched between the two webbing ends 2204 and 2202 of the first strap member 220 and secured in common therewith by the stitching 2226. A ring receiving pocket 2228 capturing a corresponding closed ring 160 therein is formed between the securement loops 2222 and 2242. The ring receiving pocket 2228 is formed by portions of the overlying webbing disposed between the stitching 2224 and the stitching 2226.

Figure 7:
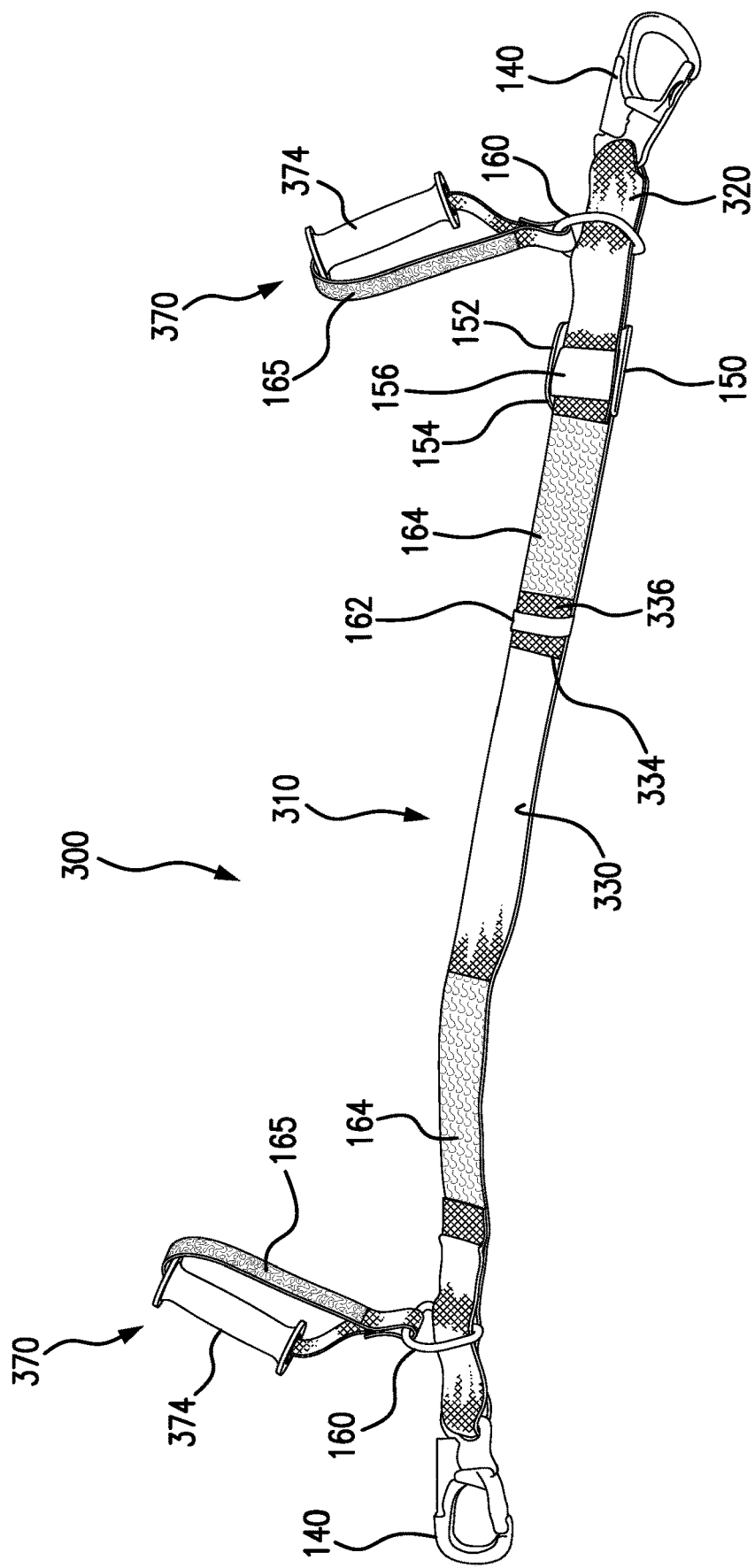
FIG. 7 illustrates the arrangement of FIG. 6 with the handles released from their storage positions.

Referring now to FIGS. 6 and 7, there is shown firefighter rescue system 300, which differs from system 200 in only one respect; the method by which handles 370 are permanently affixed to the flexible harness 310. Therefore, outside this one difference between the structure system 300 from that of system 200, construction is otherwise identical. Further, those elements in common with system 100 are carried over as well, and vice versa. Hereto, the elements that form the handles 370 are the same as those of the handles 270 and 170, and only differ in the method and structure for coupling the handle strap 372 to the harness 310 of system 300.

Firefighter rescue system 300 includes a longitudinally extended and flexible harness 310 respectively coupled on opposing ends thereof to a pair of clasps 140. Clasps 140 may each be a double-action carabiner that operates as previously described and are secured to the harness 310 by a respective securement eye 148. Harness 310 includes a first strap member 320 and second strap member 330 joined together by a length adjusting mechanism, which mechanism may be a cam buckle. Still further, the harness 310 includes a pair of handles 370 permanently affixed thereto. Each of the first strap member 320 and second strap member 330 has a respective one of the pair of handles 370 coupled thereto.

Like the harness 210, harness 310 includes a pair of hook and loop fastener strips 164 secured to the second strap member 330. One of the hook and loop fastener strips 164 is disposed in proximity to the first end 322 of the second strap member 330, and the other is disposed on the handhold loop 336, adjacent the second end 334 (see also FIGS. 9A and 9B). The handles 370 each include a complementary hook and loop fastener strip 165 for releasable coupling with a corresponding one of the hook and loop fastener strips 164 to maintain the handles 370 in position when not in use. The harness 310 also includes a continuous plastic band 162 slidingly disposed on the second strap member 330 that is slid over the second end 336 of second strap member 3 30 to retain the handhold loop 336 in overlaying relationship with the second strap member 330, and thereby aids in maintaining the handhold loop 336 and the corresponding handle 370 in a stowage position until needed.

As shown in FIGS. 8, 9A, 9B and 9C, there is shown the structure of the first and second ends 322 and 324 of the first strap member 320 and the first and second ends 332 and 334 of the second strap member 330, of the flexible harness 310, in greater detail. The structure of first and second ends 322 and 324 of the first strap member 320 and the first and second ends 332 and 334 of the second strap member 330, are identical to that described for the first and second strap members 220 and 230, but without the sandwiching of the handle strap between the layers of the webbing. Instead, the handle strap 372 of each handle 370 is affixed to a corresponding one of the closed rings 160 by a second loop 3724 of the corresponding handle strap 372.

Each handle 370 includes a handle strap 372 formed of synthetic webbing, as in handles 170 and 270. The handle strap 372 is formed in two loops 3722 and 3724. The first of the two loops 3722 is threaded through the tubular hand grip 374 that serves to hold the first loop open to allow the gloved hand of a rescuer to quickly and easily grasp the handle 370 by the hand grip 374. The second loop 3724, a significantly smaller loop than the first loop 3722, provides coupling to a respective one of the closed rings 160. The distal end of the handle strap 372 is threaded through a corresponding one of the closed rings 160 and the two ends of the handle strap 372 are then overlapped, one over the other, and both ends of handle strap 372 are disposed in overlaying relationship with an intermediate portion of the strap material between the first and second loops 3722 and 3724, and secured by stitching 3725.

Like the handles 270, each of the handles 370 include a hook and loop fastener strip 165 secured to a portion of the corresponding handle strap 372. The hook and loop fastener strips 165 of the handles 370 are respectively releasably coupleable to a corresponding one of a pair of complementary hook and loop fastener strips 164 secured to the second strap member 330. One of the two hook and loop fastener strips 164 is secured adjacent the first end 322 of the second strap member 330 and the other hook and loop fastener strip 164 is secured adjacent the second end 334 of the second strap member 330, on the handhold 336.

Figure 8:
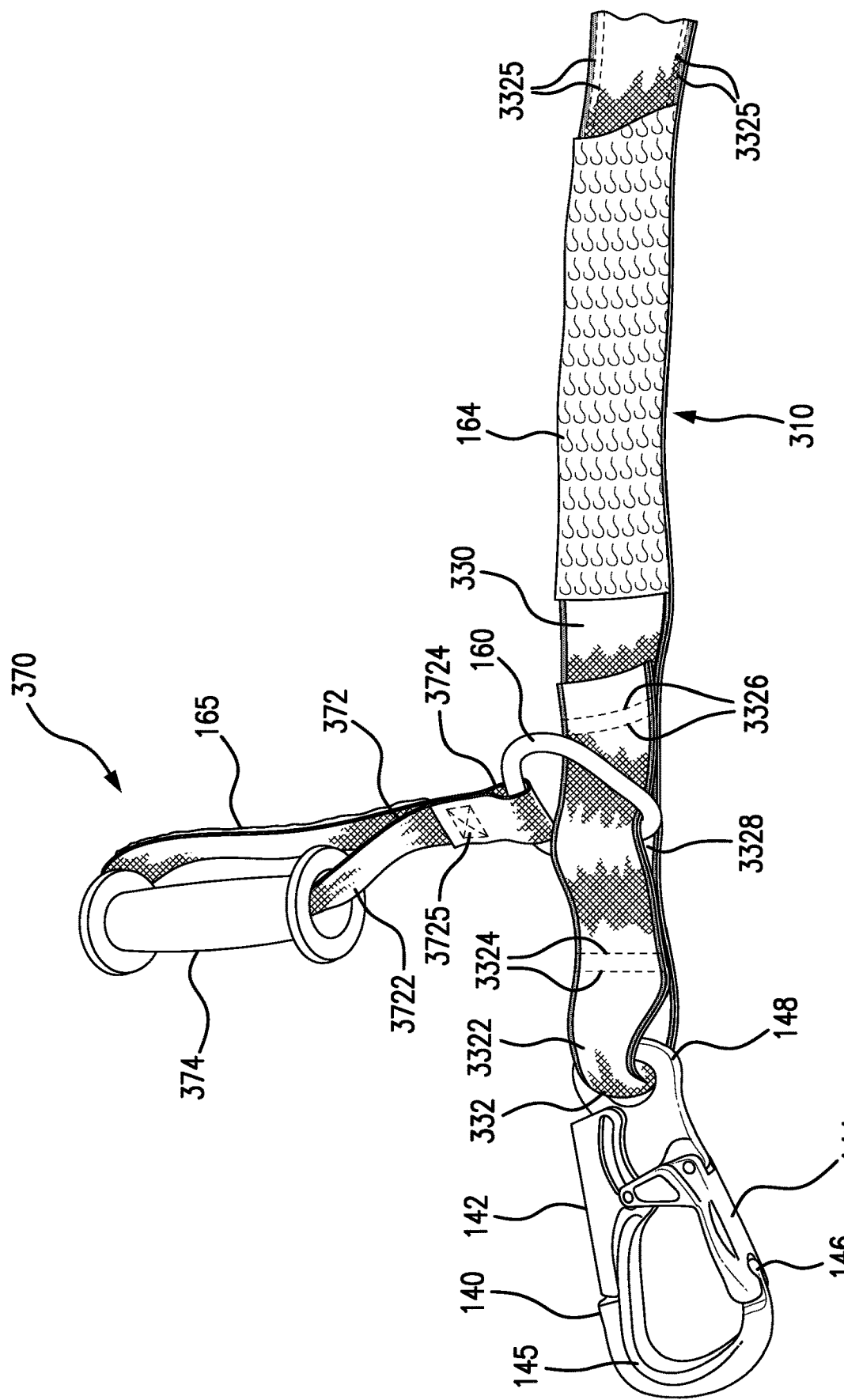
FIG. 8 is an enlarged partial view of one end of the firefighter rescue system illustrated in FIG. 7.

As shown in FIG. 8, the first end 332 of the second strap member 330 is engaged with the securement eye 148 of the corresponding clasp 140 by means of the securement loop 3322 formed thereat. The overlaying layers of the webbing material adjacent the first end 332 are secured together by stitches 3324 to form the securement loop 3322. The end portion of the webbing is passed through the closed ring 160 and a second set of stitches 3326 secure the end portion of the webbing to the underlying adjacent webbing portion, at a location longitudinally spaced from the stitching 3324 to form a ring receiving pocket 3328, in which the closed ring 160 is thereby secured.

Figure 9A:
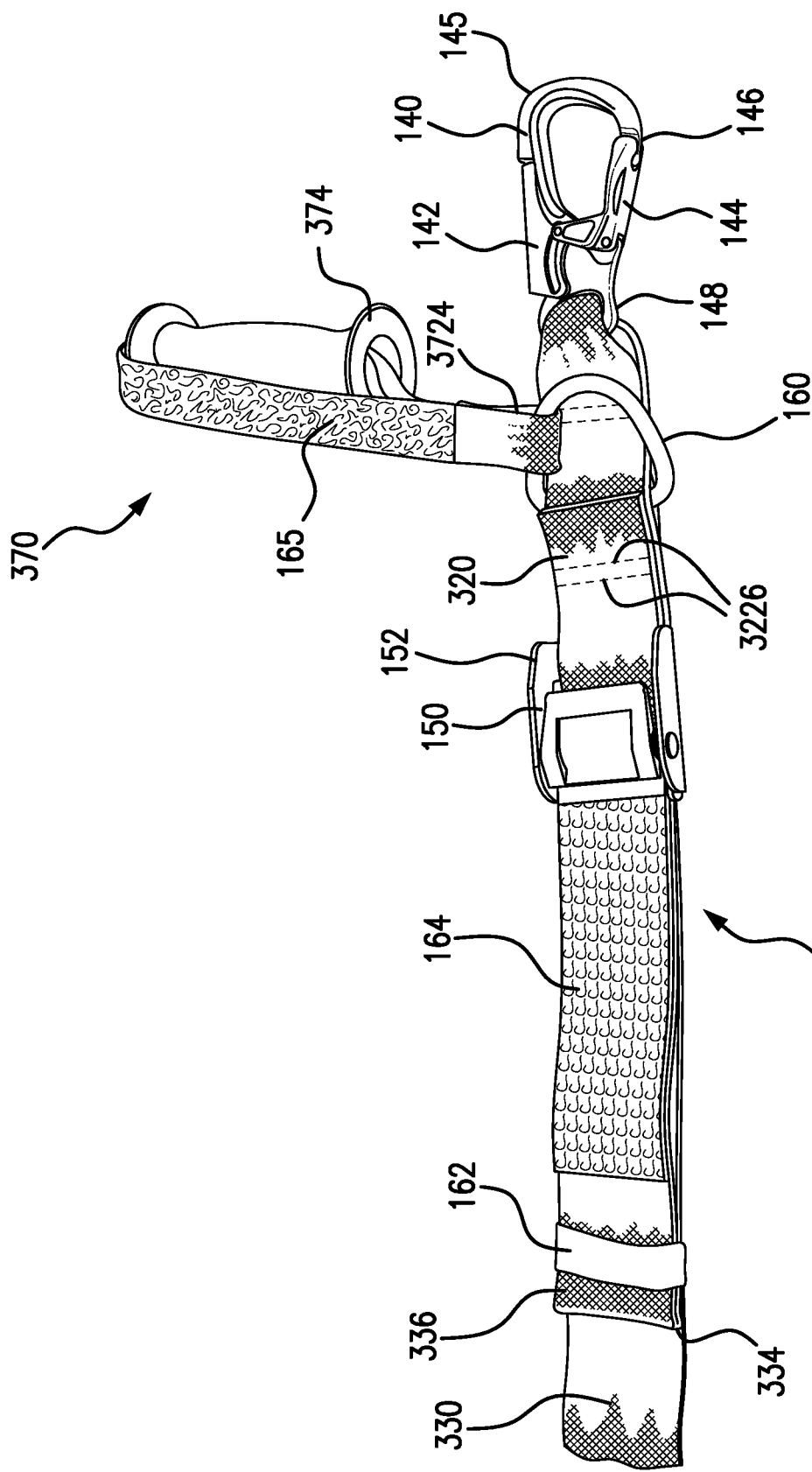
FIG. 9A is an enlarged partial view of another end of the firefighter rescue system illustrated in FIG. 7.
Figure 9B:
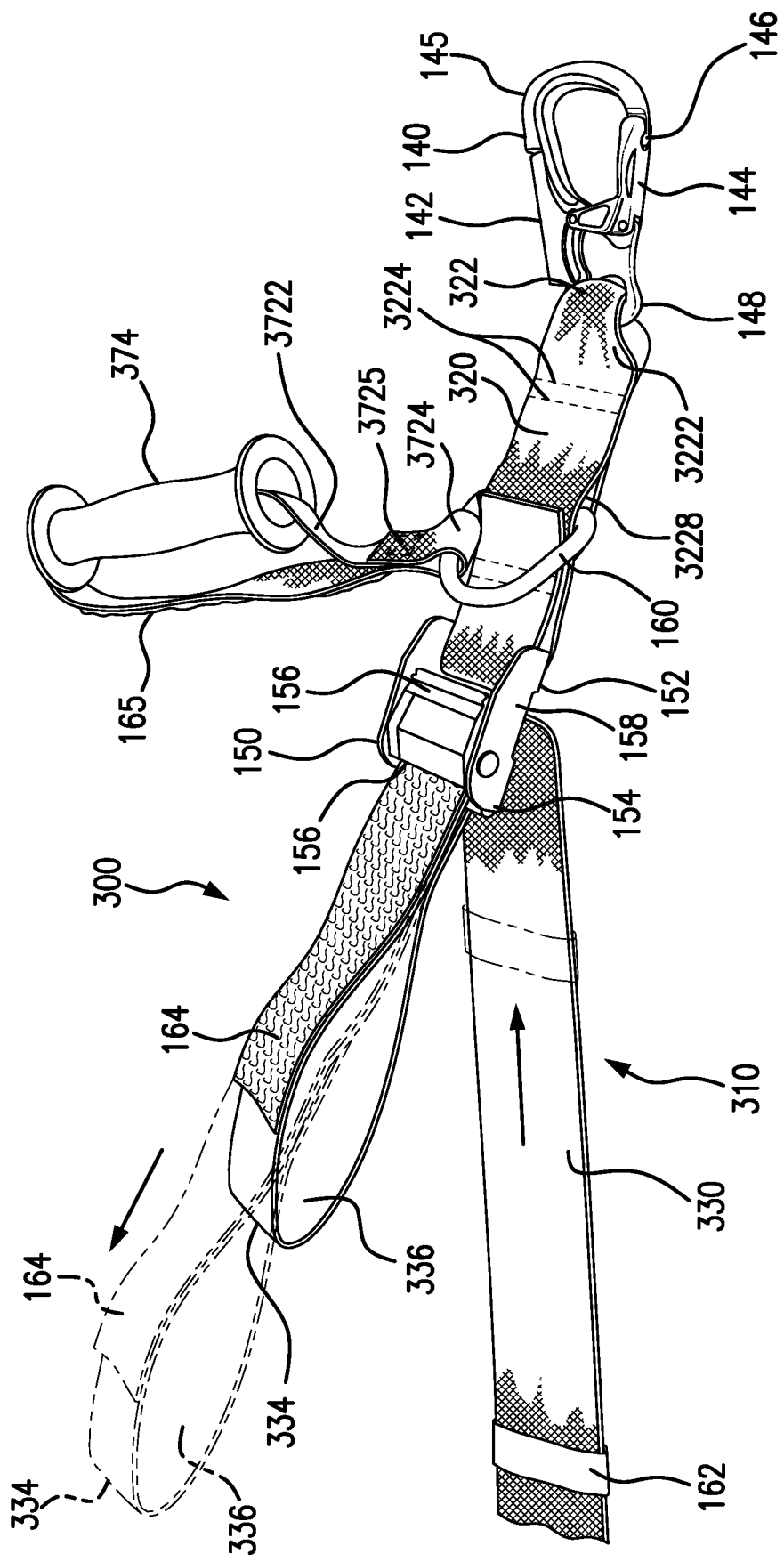
FIG. 9B is an enlarged partial view of the end of the firefighter rescue system illustrating the length adjustment of the flexible harness.
Figure 9C:
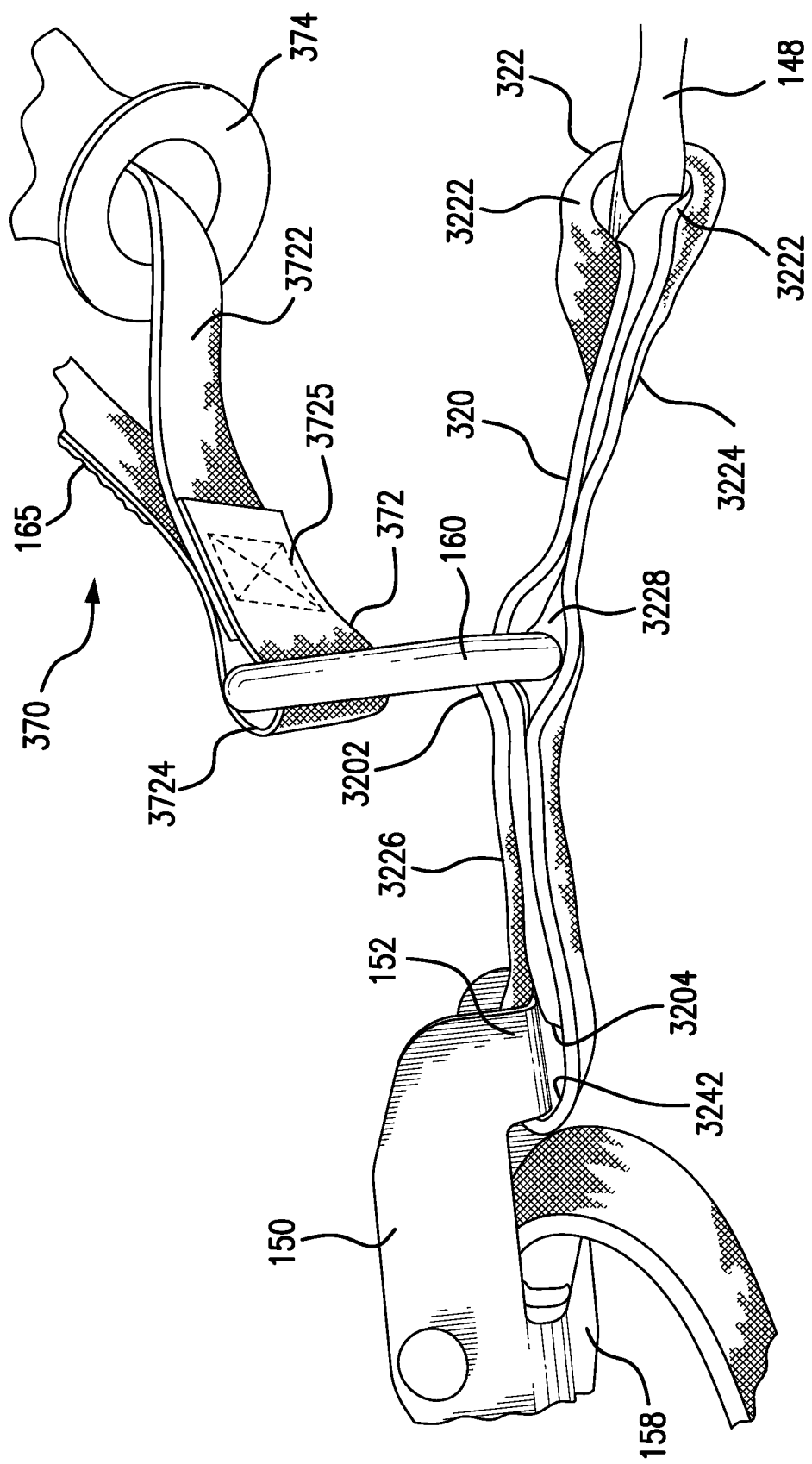
FIG. 9C is a further enlarged partial view of the end of the firefighter rescue system illustrated in FIG. 9A.

On the opposing end of the flexible harness 310, as shown in FIGS. 9A, 9B and 9C, the first end 322 of the first strap member 320 is engaged with the securement eye 148 of the corresponding clasp 140 by means of the securement loop 3222 formed thereat. The overlaying layers of the webbing material adjacent the first end 332 are secured together by stitches 3224 to form the securement loop 3222. The end portion of the webbing that was passed through the securement eye 148 is passed through the corresponding closed ring 160 and a second set of stitches 3226. The opposing end of the webbing passes the fixed end 152 of the length adjusting mechanism 150 and may overlay or underlay the opposing end of the webbing that was passed through the closed ring 160. The overlaying ends of the webbing of the first strap member 320 are joined by a second set of stitches 3226. The stitching 3226 is at a location longitudinally spaced from the stitching 3224 to form a ring receiving pocket 3228 therebetween, and in which the corresponding closed ring 160 is thereby secured.

The length of flexible harness 300 is easily adjusted when being applied to a downed firefighter. As shown in FIG. 9B, the length of flexible harness 300 between the distal ends of the clasps 140 is reduced from its initial transport configuration by pulling the second end 334 of the second strap member 330 in a direction substantially away from the length adjusting mechanism 150, which is a cam buckle in the exemplary firefighter rescue system 300 illustrated in the figure. Pulling the second end 334 of the second strap member 330, draws a portion of the second strap member 330 through the length adjusting mechanism 150 to thereby increase a length of the portion of the second strap member 330 between the second end 334 and the length adjusting mechanism 150.

Accordingly, the length of the remaining portion of the second strap member 330, between the first end 322 thereof and the length adjusting mechanism 150, is correspondingly reduced. While the handhold loop 336 is formed at the second end of the second strap member 330 is provided for use in pulling the second strap member as just described, in the interest of expediency, a rescuer may choose to simply grasp a portion of the second strap member 330 adjacent the second end 334 to exert the pulling force thereto. The retention band 162 is slidable on the second strap member 330, but may be carried therewith as a portion of the second strap member 330 is pulled through the length adjusting mechanism 150. However, when the retention band 162 reaches the frame 158 of the length adjusting mechanism 150, the frame 158 will offer sufficient resistance to force the retention band 162 to slide on the second strap member. The flexible harness 310 may be returned to its initial length by lifting the trigger 156 and reversibly pulling the second strap member 330, a portion intermediate the first end 332 and the length adjusting mechanism 150, through the length adjusting mechanism 150.

Turning now to FIG. 10, there is shown firefighter rescue system 300 in a transport configuration. For transport, system 300, and likewise systems 100 and 200, is coupled to a RIT bag 10 and is usable as a shoulder strap for transport of both the firefighter rescue system and the RIT bag 10 to the aid of a downed firefighter. While system 300 is being used as a shoulder strap, this transport configuration is in effect a storage configuration from which it may be deployed to extract a downed firefighter to a safe location. In this transport configuration, the clasps 140 at an opposing end of the flexible harness 310, are coupled to corresponding connection rings 12 disposed adjacent opposing ends of the RIT bag 10. When the rapid intervention team is called upon to attend to a downed firefighter, it is standard operating procedure to transport the RIT bag 10 to the location of the downed firefighter. If system 300 is needed to extricate a downed firefighter, the pair of clasps 140 are disengaged from the connection rings 12, RIT bag 10, and applied to the backplate of the downed firefighter's SCBA, as will be described in following paragraphs.

Figure 11:
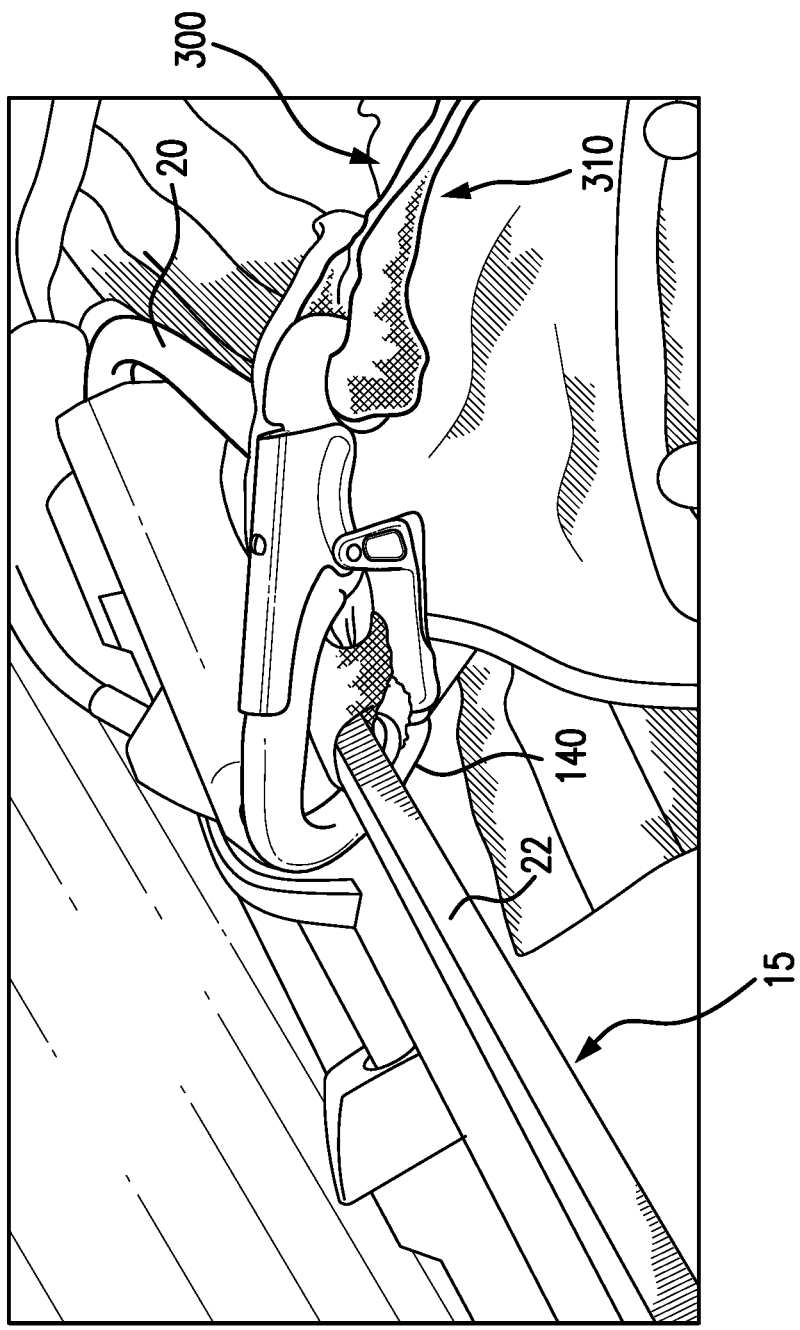
FIG. 11 is an enlarged partial view illustrating connection of the present invention to a backplate of a downed firefighter's self-contained breathing apparatus.
Figure 12:
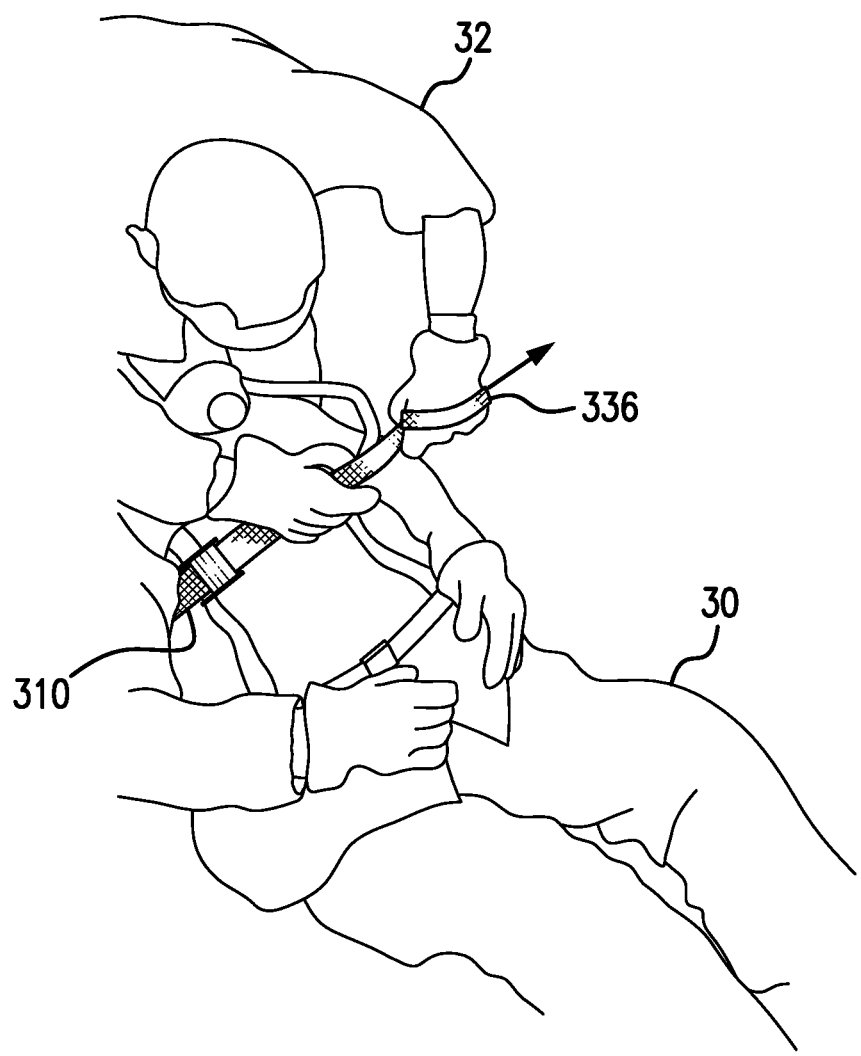
FIG. 12 is a partial view illustrating a rescuer adjusting the length of the present invention in preparation for extraction of a downed firefighter.
Figure 13:
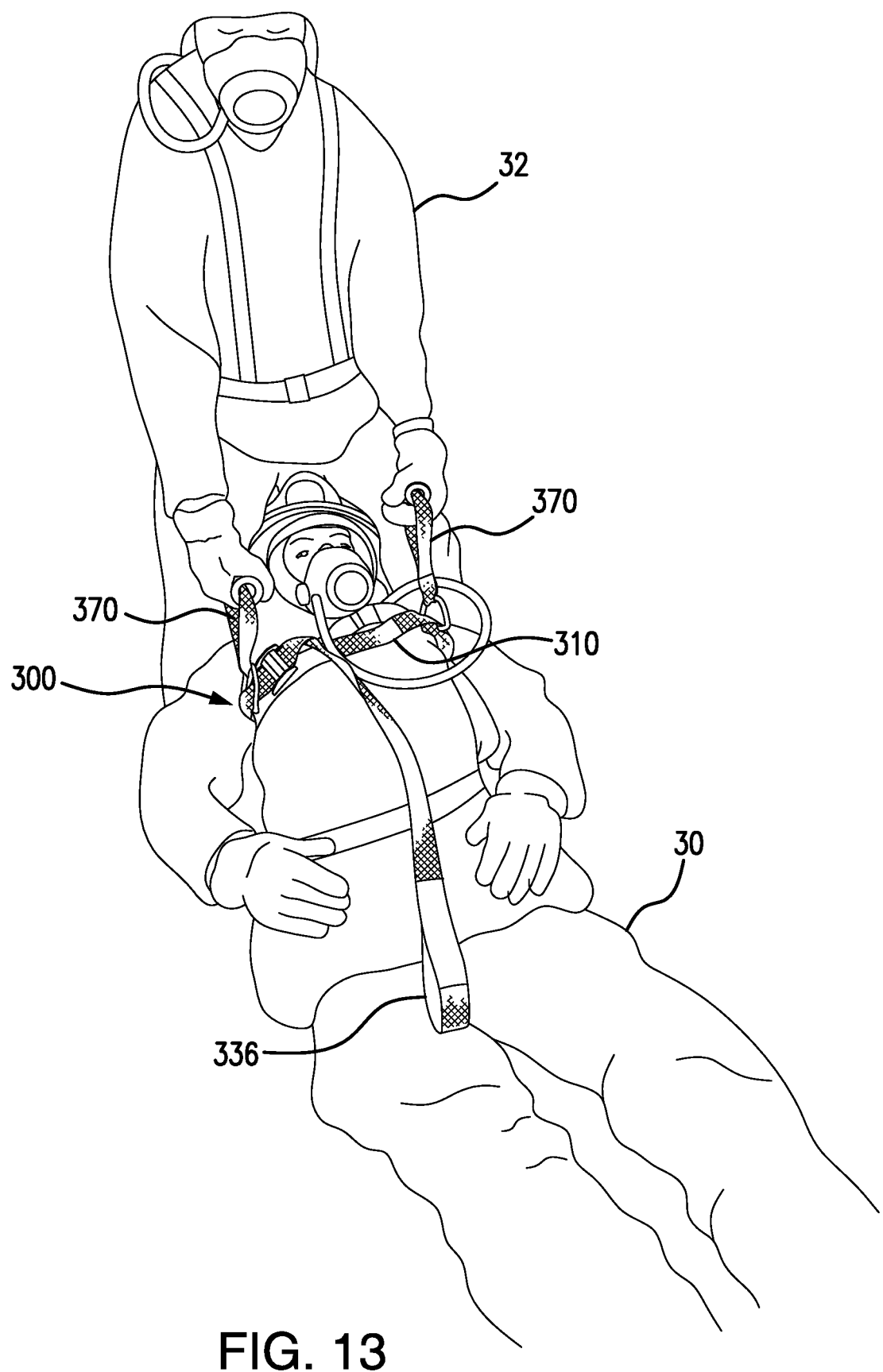
FIG. 13 is an illustration of the present invention being used for extraction of a downed firefighter.

Turning now to FIGS. 11-13, the use of firefighter rescue system 300 will now be described. When necessary to remove an incapacitated firefighter 30 to safety, one of the clasps 140 of system 300 is coupled to a corresponding side handle 22 of the backplate 20 of the downed firefighter's SCBA 15. The harness 310 is passed under the arm of the downed firefighter 30 and passes across his chest and then is passed under his other arm for the clasp 140 on the opposing end of harness 310 to be coupled to the side handle 22 on the opposing side of backplate 20. Unlike prior art drag strap systems employed heretofore, the rescuer 32 grasps the second end 334, ideally using the handhold loop 336, and tightens harness 310 to the downed firefighter's chest. By this action, the downed firefighter's SCBA 15 is brought tightly to the downed firefighter's body, taking out all of slack in the SCBA's backplate harness, making the backplate 20 and the downed firefighter 30 as one. Accordingly, when the upper torso of the downed firefighter is raised while being dragged, the SCBA air tank 24 is likewise raised therewith, and thus reduces sliding resistance and the potential for damaging the downed firefighter's SCBA 15 or dislodging his breathing mask. FIG. 13 illustrates one application of harness 310 to the downed firefighter's body, that is easiest to illustrate, and while functional, it is not the preferred method of dragging. In the illustrated method, once the harness 310 is tightened, a single rescuer 32 can then reach over the shoulder of the downed firefighter 30, grab the two handles 370 and drag the downed firefighter 30 to safety. In a preferred method, the handle straps 372 of two handles 370 are brought behind the arms of the downed firefighter 30 so that rescuer 32 reaches behind the torso of the downed firefighter 30, grabs the two handles 370 and then drags the downed firefighter 30 to safety. This scheme provides the rescuer 32 with more leverage and raises the upper body of the downed firefighter 30 higher to further space the SCBA 15 higher from the ground. As an alternate to a single rescuer drag the downed firefighter, a pair of rescuers (not shown) can each grasp a corresponding one of the two handles 370 and work in concert to drag the downed firefighter 30 to safety. This method of extricating a downed firefighter is also more easily practiced with the handles being grabbed behind the downed firefighter's shoulders.

Figure 14:
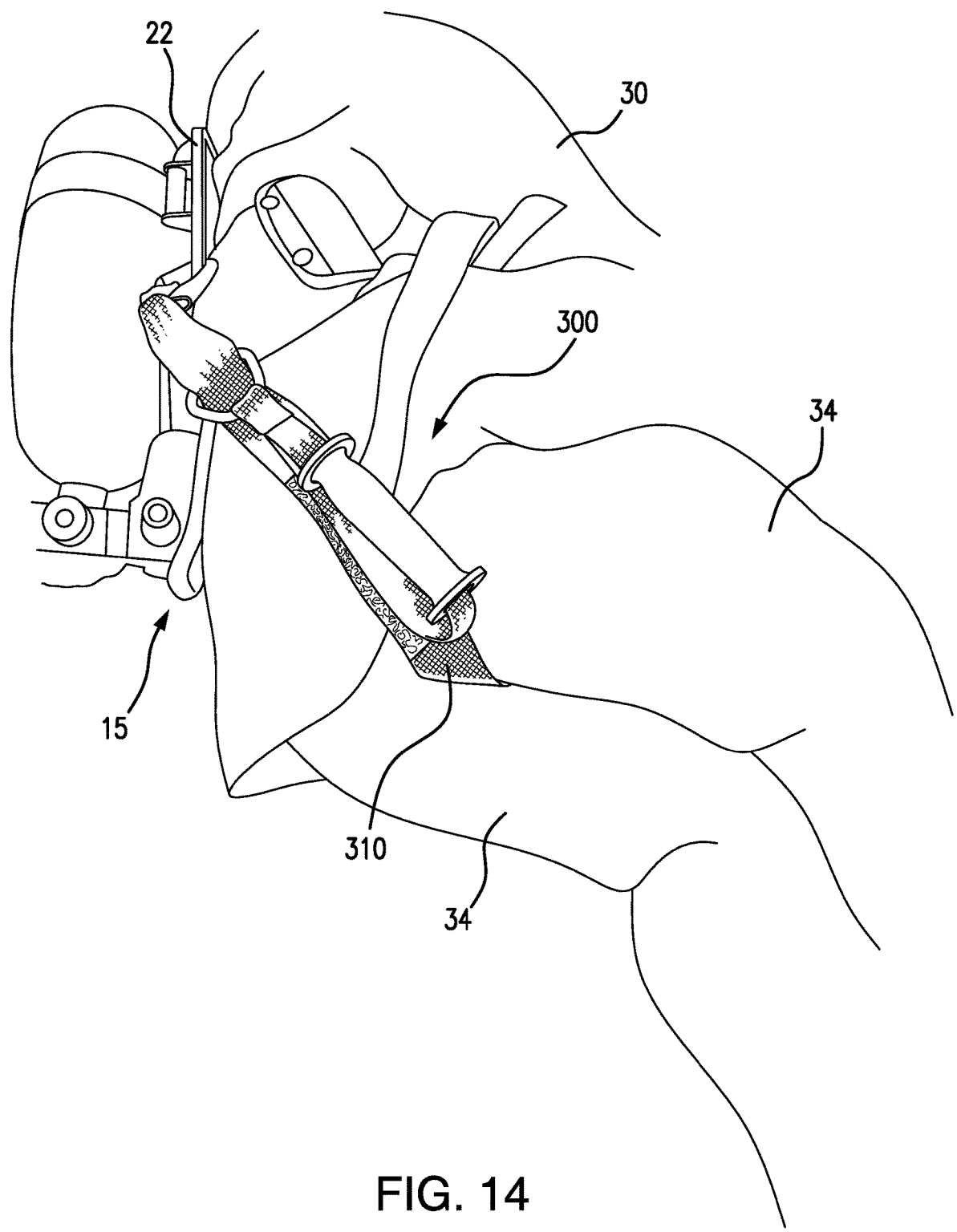
FIG. 14 is an illustration of an alternate application of the present invention to a downed firefighter when hoisting is necessary for extraction.

As shown in FIG. 14, the harness 310 can be reconfigured to pass from the connection made with one of the backplate handles 22 by a clasp 140, and then extend between the legs of the downed firefighter and then up across the downed firefighter's torso and under his arm corresponding to the opposing side of the SCBA 15 for connection of the other clasp 140 to the side handle 22 on that opposing side of the backplate 20. In this configuration, the downed firefighter is able to be hoisted up over obstacles or lowered from a height without the danger of the downed firefighter slipping out of the harness 310. The line used for hoisting or lowering the downed firefighter 30 may be coupled to a handle located at the top end of the SCBA backplate (not shown).

The descriptions above are intended to illustrate possible implementations of the present invention and are not restrictive. While this invention has been described in connection with specific forms and embodiments thereof, it will be appreciated that various modifications other than those discussed above may be resorted to without departing from the spirit or scope of the invention. Such variations, modifications, and alternatives will become apparent to the skilled artisan upon review of the disclosure. For example, functionally equivalent elements may be substituted for those specifically shown and described, and certain features may be used independently of other features, and in certain cases, particular locations of elements may be reversed or interposed, all without departing from the spirit or scope of the invention as defined in the appended Claims. The scope of the invention should therefore be determined with reference to the description above, the appended claims and drawings, along with their full range of equivalents.

What is being claimed is:

1. A firefighter rescue system, comprising:
   a pair of clasp members;
   a longitudinally extended and flexible harness affixed to said pair of clasp members on opposing ends thereof, said flexible harness being formed by a pair of strap members releasably lockingly joined together to provide adjustment of a longitudinal extent of said harness; and
   a pair of handles each being respectively secured to said harness proximate a corresponding one of the pair of clasp members.

2. The firefighter rescue system as recited in claim 1, where said pair of strap members includes a first strap being coupled to one of said pair of clasp members on one end thereof and affixed on an opposing end to a length adjusting mechanism, and a second strap member having a first end thereof coupled to the other of said pair of clasp members and an opposing second end being adjustably engaged with said length adjusting mechanism, wherein a distance between said length adjusting mechanism and said first end of said second strap member is adjustable.

3. The firefighter rescue system as recited in claim 1, where said pair of strap members includes a first strap member coupled to one of said pair of clasp members on one end thereof and affixed on an opposing end to a cam buckle, and a second strap member having a first end thereof coupled to the other of said pair of clasp members and an opposing second end threaded through said cam buckle, wherein a distance between said first end of said second strap member and said cam buckle is adjustably settable.

4. The firefighter rescue system as recited in claim 2, where said pair of handles each includes a handle strap, said handle strap of one of said pair of handles being coupled to said first strap member, and said handle strap of the other of said pair of handles being coupled to said second strap member.

5. The firefighter rescue system as recited in claim 1, where said pair of handles each includes a handle strap secured to said harness.

6. The firefighter rescue system as recited in claim 5, where said handles each includes a hand grip coupled to said handle strap.

7. The firefighter rescue system as recited in claim 3, where said second end of said second strap member is formed as a closed loop to define a handhold.

8. The firefighter rescue system as recited in claim 2, where said first strap member includes a first attachment ring disposed adjacent said one of said pair of clasp members, and said second strap member includes a second attachment ring adjacent said other of said pair of clasp members.

9. The firefighter rescue system as recited in claim 8, where said pair of handles each includes a handle strap, each said handle strap being coupled to a respective one of said first and second attachment rings.

10. The firefighter rescue system as recited in claim 9, where each of said handle straps is coupled to a corresponding one of said first and second attachment rings by an attachment member.

11. The firefighter rescue system as recited in claim 4, where said handles each include a hand grip coupled to said handle strap.

12. The firefighter rescue system as recited in claim 9, where said handles each include a hand grip coupled to said handle strap.

13. The firefighter rescue system as recited in claim 1, where said harness includes hook and loop fasteners respectively disposed in proximity to said pair of handles and each of said pair of handles having a complementary hook and loop fastener coupled thereto for releasable coupling to said harness for storage of said pair of handles.

14. The firefighter rescue system as recited in claim 7, further comprising a retention band disposed on a portion of said second strap member and configured for releasably retaining said handhold in contiguous relationship with said portion of said second strap member as a storage position.

15. The firefighter rescue system as recited in claim 4, where said handles each include a hook and loop fastener coupled to said handle strap and a complementary hook and loop fastener coupled to said harness for storage of said pair of handles.

16. A firefighter rescue system, comprising:
   a pair of clasps;
   a longitudinally extended and flexible harness having a first strap member, a second strap member and length adjusting mechanism, each of said first and second strap members having respective first ends coupled to said pair of clasps, and an opposing second end of said first strap member being coupled to said length adjusting mechanism, a second end portion of said second strap member being adjustably engaged with said length adjusting mechanism, wherein a distance between said length adjusting mechanism and said first end of said second strap member is adjustable; and
   a pair of attachment rings respectively coupled to said first and second strap members.

17. The firefighter rescue system as recited in claim 16, further comprising a pair of handles respectively secured to said harness in longitudinally spaced relationship.

18. The firefighter rescue system as recited in claim 16, further comprising a pair of handles respectively coupled to said pair of attachment rings.

19. The firefighter rescue system as recited in claim 18, where a first of said pair of attachment rings is disposed between said first end of said first strap member and said length adjusting mechanism, and a second of said pair of attachment rings is disposed adjacent said first end of said second strap member.

20. The firefighter rescue system as recited in claim 16, where said second end of said second strap member is formed as a closed loop to define a handhold.

21. The firefighter rescue system as recited in claim 2, where said second end of said second strap member is formed as a closed loop to define a handhold.

22. The firefighter rescue system as recited in claim 3, where said first strap member includes a first attachment ring disposed adjacent said one of said pair of clasp members, and said second strap member includes a second attachment ring adjacent said other of said pair of clasp members.

23. The firefighter rescue system as recited in claim 22, where said pair of handles each includes a handle strap, each said handle strap being coupled to a respective one of said first and second attachment rings.

24. The firefighter rescue system as recited in claim 22, where each of said handle straps is coupled to a corresponding one of said first and second attachment rings by an attachment member.

\* \* \* \* \*